United States Patent [19]

Patsch et al.

[11] Patent Number: 4,472,581
[45] Date of Patent: Sep. 18, 1984

[54] IMIDAZOMETHYLENE DYES

[75] Inventors: Manfred Patsch, Wachenheim; Manfred Ruske, Ludwigshafen, both of Fed. Rep. of Germany

[73] Assignee: BASF Aktiengesellschaft, Ludwigshafen, Fed. Rep. of Germany

[21] Appl. No.: 407,892

[22] Filed: Aug. 13, 1982

[30] Foreign Application Priority Data

Aug. 24, 1981 [DE] Fed. Rep. Germany ...... 3133391

[51] Int. Cl.³ .................. C09B 9/04; C07D 401/02
[52] U.S. Cl. ................................. 546/101; 260/154; 260/156
[58] Field of Search ......................................... 546/101

[56] References Cited

U.S. PATENT DOCUMENTS 3,592,806 7/1971 Iizuka et al. .................. 260/157

FOREIGN PATENT DOCUMENTS 1404595 9/1975 United Kingdom ................ 546/101

*Primary Examiner*—Paul M. Coughlan, Jr.
*Assistant Examiner*—D. B. Springer
*Attorney, Agent, or Firm*—Oblon, Fisher, Spivak, McClelland & Maier

[57] ABSTRACT

Cationic dyes of the general formula

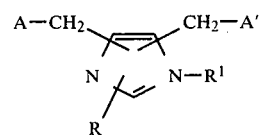

where A and A' may be identical or different and are each a monovalent radical of a dye from the series comprising the azo or quinophthalone dyes, or A and A' independently of one another are each one of the radicals of the formulae

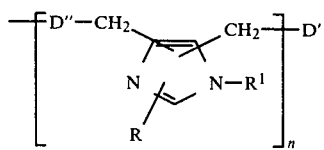

and

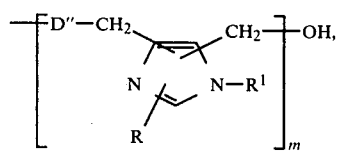

R is $C_1$–$C_6$-alkyl, benzyl or aryl, $R^1$ is hydrogen, $C_1$–$C_4$-alkyl or aryl, D' and D" are respectively a monovalent and a divalent radical of a dye from the series comprising the triphenylmethane or xanthene dyes, n is an integer $\geq 1$ and m is an integer $\geq 1$, the sum (n+m) being $\leq 10$ on average, are soluble in dilute acids, and, when they are used for wet-end dyeing of paper, give bleeding-fast, bleachable dyeings and a colorless effluent.

9 Claims, No Drawings

IMIDAZOMETHYLENE DYES

The present invention relates to cationic dyes which contain bismethyleneimidazole groups, and to their use.

Cationic dyes which contain methyleneimidazole groups have been proposed (U.S. patent application Ser. No. 233,479), the dyes being obtained by reacting a neutral dye with an imidazole and formaldehyde. These dyes, when they are used for wet-end dyeing of paper, give bleeding-fast dyeings coupled with low contamination of the effluent.

It is an object of the present invention to provide cationic dyes which are superior to those described in the above patent application in respect of bleeding-fastness on paper, and performance in wet-end dyeing of paper.

We have found that this object is achieved by cationic dyes of the general formula

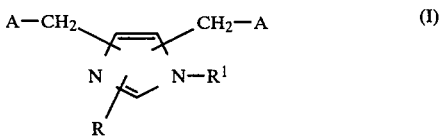

where A and A' may be identical or different and are each a monovalent radical of a dye from the series comprising the azo or quinophthalone dyes, or A and A' independently of one another are each one of the radicals of the formulae

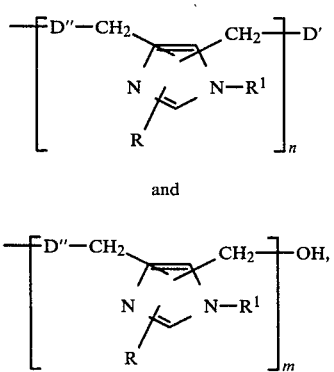

R is $C_1$–$C_6$-alkyl, benzyl or aryl, $R^1$ is hydrogen, $C_1$–$C_4$-alkyl or aryl, D' and D" are respectively a monovalent and a divalent radical of a dye from the series comprising the triphenylmethane or xanthene dyes, n is an integer $\geq 1$ and m is an integer $\geq 1$, the sum (n+m) being $\leq 10$ on average.

The substituents D'—$CH_2$—, —D"—$CH_2$— and R— are bonded to carbon atoms of the imidazole ring, and, furthermore, the —$CH_2$ groups of D'—$CH_2$— and —$CH_2$—D"— are bonded to carbon atoms of the aromatic rings of D"— and —D"— respectively.

Preferred dyes I are those in which A and A' are each a quinophthalone radical or D' and D" are each the radical of a triphenylmethane or xanthene dye, the sum (m+n) being $\leq 10$ on average, preferably $\leq 8$.

Compared with the conventional dyes, the dyes I, when they are used for wet-end dyeing of paper, give bleeding-fast dyeings and a colorless effluent. They are from slightly to readily soluble in dilute acids, eg. 5–30% strength by weight acetic acid, propionic acid, methoxyacetic acid or methanesulfonic acid.

The dyes I are obtained by condensing an appropriate dye D'H (=D"$H_2$) (IV) with a bifunctional imidazole, preferably a bishydroxymethylimidazole V, in the presence of an acidic agent;

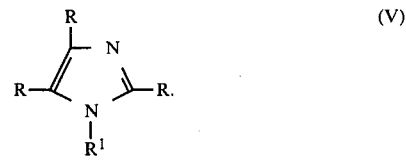

In formula V, $R^1$ is hydrogen, $C_1$–$C_4$-alkyl or aryl, 2 of the radicals R are —$CH_2$—OH and the remaining radical R is $C_1$–$C_6$-alkyl, aryl, eg. phenyl, or benzyl.

Preferred imidazoles V are those derived from 2-$C_1$–$C_6$-alkylimidazoles, eg. 2-methylimidazole or 2-ethylimidazole, and from 2-arylimidazoles, eg. 2-phenylimidazole.

The molar ratio of IV to V is as a rule from 1:0.8 to 1:2.0, preferably from 1:1 to 1:1.2.

The reaction is carried out in general at from 0 to 50, preferably from 5 to 20, °C. The reaction time is as a rule from 2 to 20 hours, and is chosen so that the resulting dye I is still readily soluble in dilute acids. The reaction time depends in particular on dye IV. Thus, for example, a readily soluble dye is obtained if C.I. Solvent Dye, C.I. No. 45,195, is stirred with the imidazole V in 96% strength by weight sulfuric acid for 6 hours at from 20° to 25° C.

If a dye which contains more than one radical (ring) capable of reacting with the hydroxymethyl groups in V is used as IV, eg. the xanthene dye C.I. No. 45,195, reaction with the bifunctional imidazole V gives a product I which contains more than 2 dye radicals, ie. n and/or m > 1. In this case, if the reaction time is excessively long, the products are polymeric dyes which are only slightly soluble, if at all, in dilute acid. As a rule, dyes where (n+m) $\leq 10$, in particular $\leq 8$, are still readily soluble, and those where (m+n) $\leq 6$ are particularly readily soluble.

As a consequence of the synthesis, suitable terminal groups for the polymeric dyes of the formula I are —OH and —D'.

The optimum conditions for the reaction of a particular dye may be readily determined by a simple series of experiments.

Acidic agents which are suitable for the process and which may simultaneously serve as the reaction medium are, for example, 80–100% strength by weight sulfuric acid or phosphoric acid, with or without agents which split off water, eg. sulfur trioxide (oleum), phosphorus pentoxide, metaphosphoric acid, polyphosphoric acid, acetic anhydride, benzenesulfonic acid or toluenesulfonic acid. A preferred acidic medium which may simultaneously serve as the reaction medium is 96–100% strength by weight sulfuric acid, not more than 12% strength by weight oleum or a mixture of 85% strength phosphoric acid and phosphorus pentoxide.

The reaction mixture is discharged onto water or ice/water, and the dye is precipitated as the free base by adding a basic agent, eg. sodium hydroxide solution, potassium hydroxide solution or ammonia, and is separated off by filtration and dried, or processed further in the form of the water-moist press cake.

Particularly preferred dyes are those of the formulae

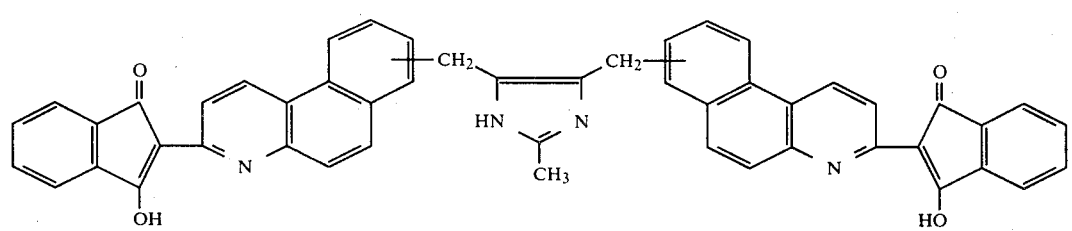

and

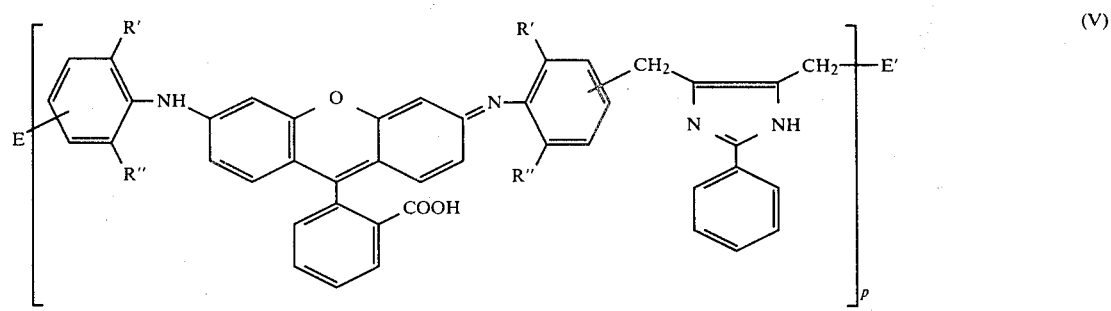

where R' and R" are each $C_1-C_3$-alkyl, p is from 3 to 6 on average, E' is —OH and E is —H or 2-phenyl-4-hydroxymethyl-4-methyleneimidazole.

The Examples which follow illustrate the invention. Parts and percentages are by weight.

EXAMPLE 1

31 parts of C.I. Solvent Dye No. 45,195 and 15.2 parts of 2-phenyl-4,5-dihydroxymethylimidazole are added successively to 270 parts of 96% strength sulfuric acid at 0°–5° C. in the course of 3 hours. Thereafter, the reaction mixture is stirred for 4 hours at from 20° to 25° C. (the starting materials are no longer detectable in the thin layer chromatogram), and then discharged onto 1,000 parts of ice-water. After the resulting mixture has been neutralized with ammonia, the product is filtered off under suction and dried at 60° C. under reduced pressure.

Yield: 47 parts of a dye which probably has the formula

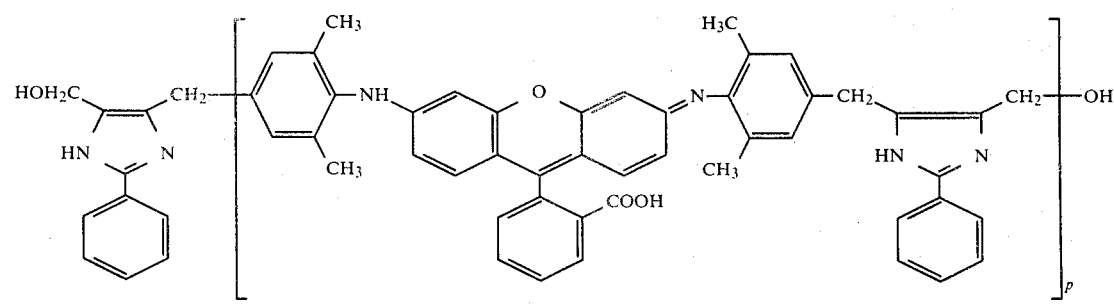

The molar ratio of dye to imidazole is 5:6.

Analysis: N Calculated: 8.28%; N Found: 8.2%; $\bar{p} \approx 5$.

The dye is insoluble in organic solvents, such as methanol, ethanol of chlorobenzene, but readily soluble in dilute acids, such as acetic acid, propionic acid, methoxyacetic acid or methanesulfonic acid.

$\lambda_{max} = 522$ nm (dilute acetic acid).

EXAMPLE 2

The procedure described in Example 1 is followed, except that the dye of the formula

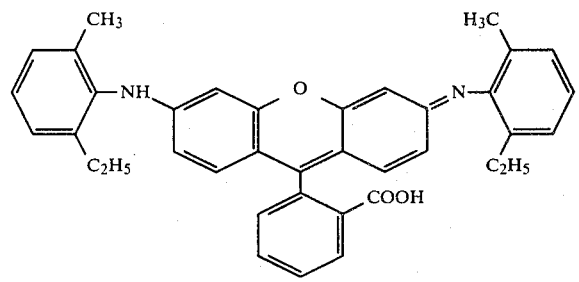

is used instead of C.I. Solvent Dye No. 45,195.

Yield: 48 parts of a dye which probably has the formula

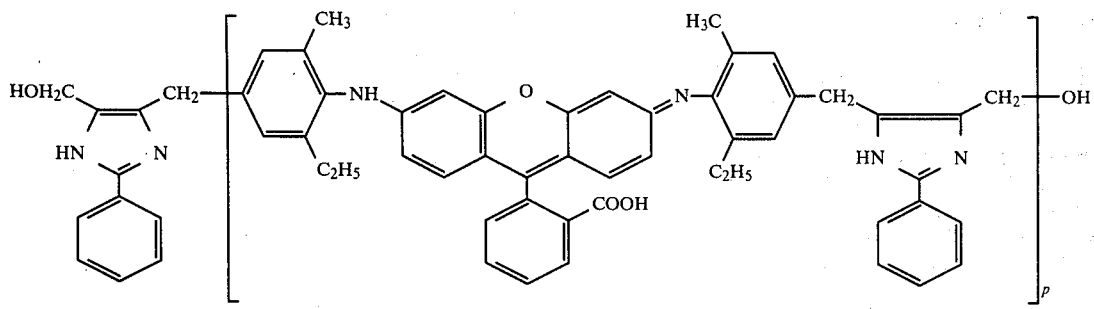

The molar ratio of dye to imidazole is 5:6.
Analysis: N Calculated: 7.98%; N Found: 8.0%; $\bar{p} \approx 5$.

$\lambda_{max}$ (in 10% strength acetic acid): 524 nm.

EXAMPLE 3

10.2 parts (0.05 mole) of 2-phenyl-4,5-dihydroxymethylimidazole and 28.3 parts (0.05 mole) of the dye of the formula

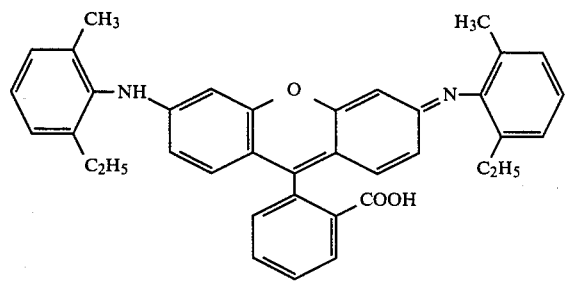

are introduced successively into 150 parts of concentrated sulfuric acid at from 0° to 5° C. in the course of 3 hours. The reaction mixture is allowed to warm up to room temperature, stirred for a further 3 hours at from 20° to 25° C., discharged onto 2,000 parts of ice, and then neutralized with 450 parts of 50% strength sodium hydroxide solution. The precipitated dye is filtered off under suction, washed, and dried at 70° C. under reduced pressure.

Yield: 31 parts of a dye which probably has the formula

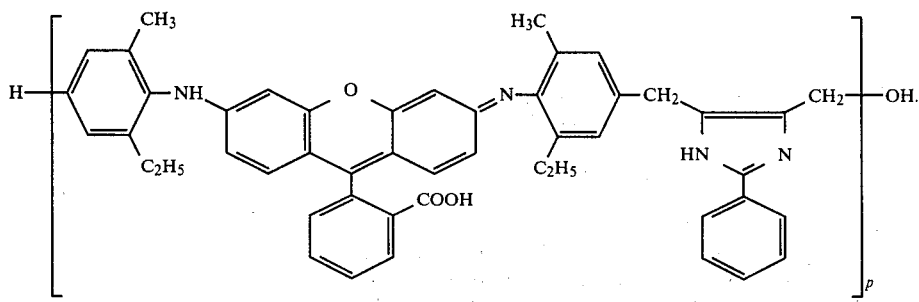

The molar ratio of starting dye to imidazole is 5:5. $\bar{p} \approx 5$.

$\lambda_{max} = 524$ nm (in 10% strength acetic acid).

EXAMPLE 4

25.8 parts of Solvent Blue 23, C.I. No. 42,760 and 15.3 parts of 2-phenyl-4,5-dihydroxymethylimidazole are introduced successively into 270 parts of concentrated sulfuric acid at from 0° to 5° C. The mixture is allowed to warm up to 20°–25° C., stirred at this temperature for 10 hours, discharged onto 1,000 parts of ice-water and then neutralized with ammonia. The dye is filtered off under suction and dried at 60° C. under reduced pressure.

Yield: 38 parts of a dye which probably has the formula

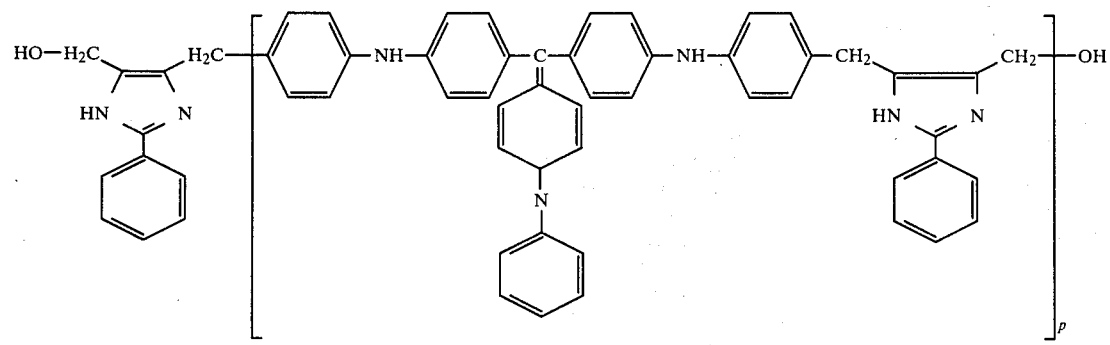

The molar ratio of starting dye to imidazole is 3:4.

Analysis: N Calculated: 10.56%; N Found: 11.2%; $\bar{p} \approx 3$.

$\lambda_{max}$ (in 90% strength acetic acid): 593 nm.

EXAMPLE 5

The procedure described in Example 1 is followed, except that 9 parts of 2-methyl-4,5-dihydroxymethylimidazole are used instead of 2-phenyl-4,5-dihydroxymethylimidazole.

Yield: 33 parts of a dye which probably has the formula

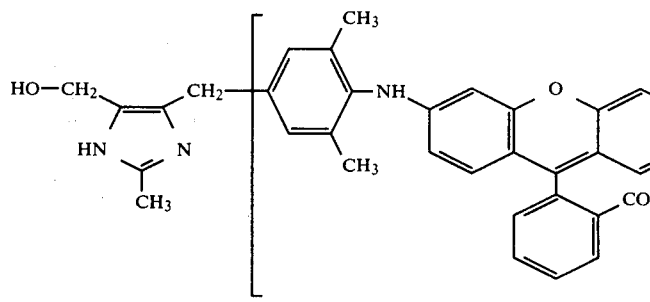

The molar ratio of starting dye to imidazole is 5:6.

Analysis: N Calculated: 9.19%; N Found: 8.9%; $\bar{p} \approx 5$.

$\lambda_{max}$: 524 nm (in 40% strength acetic acid).

EXAMPLE 6

16.1 parts of 5,6-benzoquinophthalone and 15.2 parts of 2-phenyl-3,4-dihydroxymethylimidazole are introduced successively into 270 parts of concentrated sulfuric acid at from 0° to 5° C. The reaction mixture is allowed to warm up to 20°–25° C., stirred at this temperature for 10 hours, discharged onto 1,000 parts of ice-water, and then neutralized. Thereafter, the precipitate is filtered off under suction and dried at 60° C. under reduced pressure, giving 32 parts of the dye

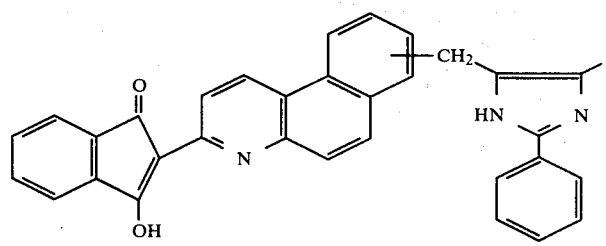

$C_{55}H_{34}N_4O_4$     molecular weight = 814

Analysis: N Calculated: 6.88%; N Found: 8.6%.

$\lambda_{max}$ (in 50% strength acetic acid): 422 nm.

USE EXAMPLE 2 g of a 10% strength solution of the dye from Example 1 in acetic acid are added to a suspension of 50 g of bleached sulfite pulp in 2 l of water, and the mixture is stirred gently for 15 minutes at from 20° to 25° C., and then diluted with water to a solids content of 0.2%. This suspension is used to produce paper sheets in a laboratory sheet-forming apparatus, and the sheets are dried for 5 minutes at 100° C. Sheets which have been dyed red are obtained and the effluent from the dyeing is completely colorless. The bleeding-fastnesses in accordance with DIN 53,991 when various test liquids are used are rated at 5, ie. no bleeding. The dyeing can be bleached with hypochlorite.

Similar results are obtained when the dyes obtained as described in Examples 2, 3, 4, 5 and 6 are used.

We claim:

1. A cationic dye of the formula

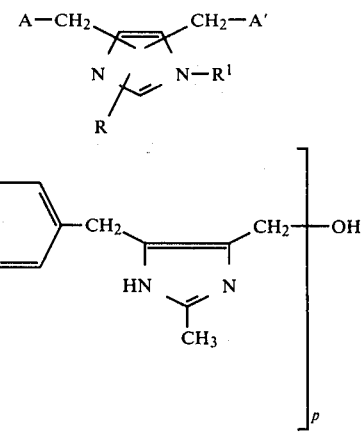

where A and A' may be identical or different and are each a monovalent quinophthalone dye radical, or A and A' independently of one another are each one of the radicals of the formulae

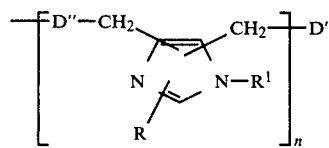

and

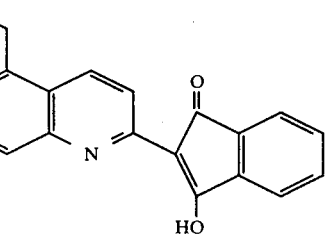

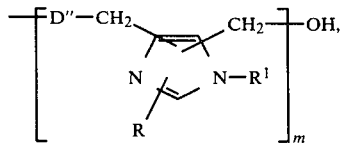

R is $C_1$–$C_6$-alkyl, benzyl or aryl, $R^1$ is hydrogen, $C_1$–$C_4$-alkyl or aryl, D' and D" are respectively a monovalent and a divalent radical of a triphenylmethane or xanthene dye, n is an integer ≧1 and m is an integer ≧1, the sum (n+m) being ≦10.

2. A dye as claimed in claim 1, wherein D' and D" represent respectively a monovalent and a divalent radical of a dye from the series comprising the xanthene dyes.

3. A dye as claimed in claim 1, wherein D' and D" are, respectively, a monovalent and a divalent radical of a triphenylmethane or xanthene dye, n and m are each an integer of $\geq 1$, and the sum (m+n) is $\leq 8$.

4. A dye as claimed in claim 1 or 2 or 3, wherein $R^1$ is hydrogen and R is 2-phenyl, 2-methyl or 2-ethyl.

5. A dye as claimed in claim 3, wherein $R^1$ is hydrogen, R is 2-phenyl, 2-methyl or 2-ethyl and the sum (n+m) is from 3 to 6.

6. A cationic dye as claimed in claim 3, obtainable by condensing a triphenylmethane or xanthene dye with a bishydroxymethylimidazole of the formula

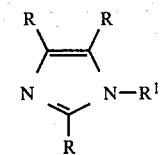

where $R^1$ is hydrogen, $C_1$-$C_4$-alkyl or phenyl, 2 of the radicals R are —$CH_2$—OH and remaining radical R is $C_1$-$C_6$-alkyl, benzyl or phenyl, in the presence of an acidic condensation agent, wherein the molar ratio of dye to bishydroxymethylimidazole is from 1:0.8 to 1:2.0.

7. A dye of the formula

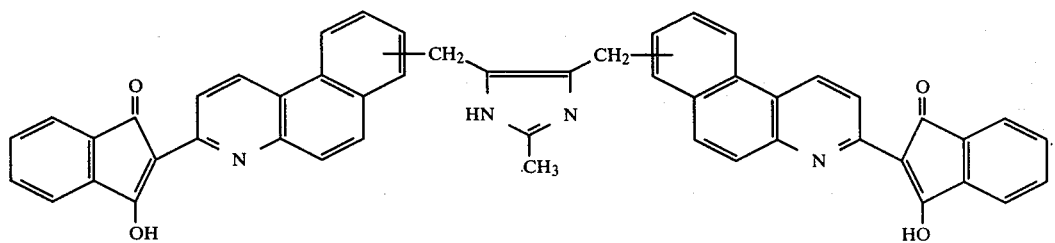

8. A dye of the formula

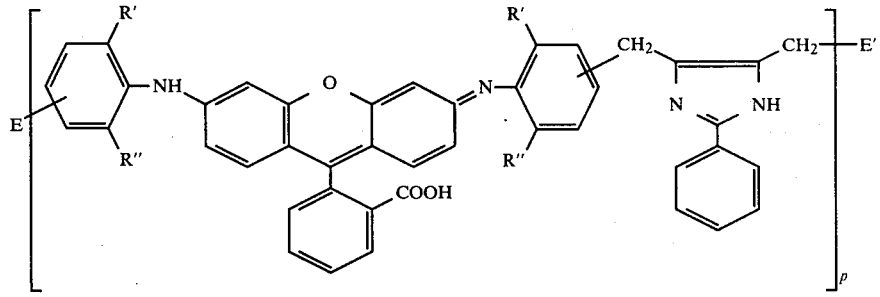

where R' and R" independently of one another are each $C_1$-$C_3$-alkyl, E is hydrogen or 2-phenyl-4-hydroxymethyl-5-methyleneimidazole, E' is hydroxyl and p is from 3 to 6 on average.

9. A dye as claimed in claim 8, wherein R' is methyl and R" is ethyl.

* * * * *